United States Patent [19]

Axelrod et al.

[11] 4,041,218

[45] Aug. 9, 1977

[54] SEPARATOR FOR ALKALINE STORAGE BATTERIES

[76] Inventors: Shoya Samuilovich Axelrod, prospekt Energetikov, 46, korpus 1, kv. 215, Leningrad; Viktor Grigorievich Belozerov, ulitsa Mendeleeva, 53, kv. 71, Kursk; Mikhail Bentsionovich Gershman, prospekt Kima, 30, kv. 25, Leningrad; Evel Grigorievich Margolin, Svetlanovsky prospekt, 62, korpus 1, kv. 233, Leningrad; Mikhail Borisovich Shapot, Shkolnaya ulitsa, 64, kv. 7, Leningrad, all of U.S.S.R.

[21] Appl. No.: 647,460

[22] Filed: Jan. 7, 1976

[51] Int. Cl.² .......................................... H01M 2/18
[52] U.S. Cl. .................................................. 429/136
[58] Field of Search .............. 136/142, 143, 145, 147, 136/146, 63; 429/131, 136, 129, 81, 138, 139

[56] References Cited

U.S. PATENT DOCUMENTS

| 1,506,391 | 8/1924 | Sturges | 136/147 |
| 2,454,100 | 11/1948 | Slayter | 136/145 |
| 2,970,181 | 1/1961 | Corren | 136/143 |
| 3,565,697 | 2/1971 | Nilsson et al. | 136/142 |

Primary Examiner—Donald L. Walton
Attorney, Agent, or Firm—Lackenbach, Lilling & Siegel

[57] ABSTRACT

A separator for alkaline storage batteries which is a reticular flexible envelope arranged about an electrode, the envelope being formed by interlacing rods. The first group of rods is arranged substantially parallel with respect to the longitudinal axis of the electrode and the second group of rods is arranged with an inclination relative to the first group of rods. A thickness ratio of the first rod group and the second rod group is within the range of about 2 to 4.

5 Claims, 2 Drawing Figures

SEPARATOR FOR ALKALINE STORAGE BATTERIES

The present invention relates to alkaline storage batteries and, more precisely, to separators for alkaline storage batteries.

The invention can be used for producing alkaline, thrust, car, disel and other types of storage batteries.

Known in the art are various types of separators used in alkaline storage batteries intended for spacing apart the electrodes of opposite polarity for the purpose of preventing short-circuits and to ensure their operational reliability. Among others there are the following types: ebonite sticks, rubber or plastic cords, plastic frames of various types, boards made of perforated vinylplastic sheets, etc.

Ebonite sticks and rubber or plastic cords are disposed between electrodes of opposite polarity along the width thereof and spaced apart. Consequently, the electrodes of opposite polarity are reliably separated only at the points where the ebonite sticks and the rubber or plastic cords are located. For the purpose of preventing short-circuiting along the whole width of the electrodes the interelectrode gap is increased. This results in reducing the useful volume and also in causing poor electrical specific characteristics of the storage batteries.

Plastic frames manufactured by the inefficient method of injection moulding proved to be uneconomical.

Perforated vinylplastic sheets show unsufficient reliability in operation. The above disadvantage is due to the fact that at high temperatures the corrugation tends to disappear, thus causing shorts.

Recently separators for alkaline storage batteries were introduced which are embodied as a reticular flexible envelope arranged about the electrode. They are manufactured by a highly efficient and simple extrusion method and are more reliable than the known separators.

A separator is known which is embodied as a reticular flexible envelope formed by interlacing plastic rods of equal thickness. The rods are arranged with an inclination relative to the electrode's longitudinal axis. The rods are welded at the points of intersection.

In operation, particles of the active mass separate from the electrode's surface and fall into the interelectrode gap, partially settling on the inclined rods and causing current leakages and shorts. Consequently, it is often necessary to wash the battery, which complicates the operation.

This disadvantage is partially eliminated in another known separator which is also a reticular flexible envelope arranged about the electrodes of the same polarity and formed by interlacing flexible plastic rods of equal thickness. However, in this separator the first group of rods is arranged with an inclination relative to the longitudinal axis of the electrodes and the second group is arranged substantially parallel with respect to the first group of rods.

Due to the design of the separator the active mass particles which have separated from the electrode's surface tend to settle only on the inclined rods rather than on the parallel rods, but they slip along the surface thereof since in operation the electrodes and the rods are arranged vertically. However, shorts and current leakages take place in the described separator and the prior art storage battery has a low operational reliability.

It is an object of the present invention to improve the reliability of the storage battery by preventing current leakages and shorts.

It is another object of the invention to simplify the operation of the storage battery.

These and other objects are achieved by providing a separator for alkaline storage batteries which is a reticular flexible envelope arranged about each electrode of the same polarity and formed by interlacing rods, some of the rods being arranged in parallel along the longitudinal axis of the electrode and other rods being inclined with respect the to the first rods; according to the invention, a thickness ratio of the rods arranged in parallel to the longitudinal axis of the electrode to the inclined rods is within the range of about 2 to 4.

The described separator prevents current leakages and shorts, thereby insuring a reliable operation. It is achieved in the following manner.

As described above, the cause of current leakages and shorts between electrodes of opposite polarity resides in the separation of active mass particals from the electrod's surface and their disposition on the inclined rods. Consequently the thinner the inclined rods the smaller the amount of active mass particals that will be deposited thereon, which are conducive to current leakages and shorts. Therefore, the inclined rods should be as thin as possible whereas the vertical rods should be as thick as possible, with the gap remaining optimal. The minimal thickness of the inclined rods manufactured by the extrusion method is within 0.2 to 0.35 mm. Any further decrease of the rod thickness results in their breakage both in the process of manufacturing and of assembling the storage battery and also in operation. The maximum thickness of the vertical rods is determined, on the one hand, by the high specific volume characteristics and, consequently, by the optimal interelectode gap. On the other hand, it is determined by the optimal interelectrode gap for the purpose of avoiding shorts in the storage batteries. As a rule the gap is about 1.0 mm.

Thus, if the thickness of the inclined rods is 0.2–0.35 mm, the thickness of the vertical rods is accordingly 0.8–0.7 mm and the thickness ratio of the vertical to the inclined rods is within the range of about 2 to 4. This is the optimal ratio. Any further decrease of the lower limit will result in shorts owing to the disposition of the active mass particals on the inclined rods. Any further increase of the upper limit is either technologically impossible because of problems in manufacturing very thin and unreliable rods, or results in poor specific electrical volume characteristics of the storage battery due to the increased interelectrode gap. The gap is increased because of the increased thickness of the vertical rods.

The separator, as described above, simplified battery operation, since it does not require frequent washing of the battery owing to the disposition of the active mass particals on the inclined rods.

Other objects and advantages of the present invention will become apparent from an embodiment thereof taken in conjunction with the accompanying drawings, wherein.

Figure 1:
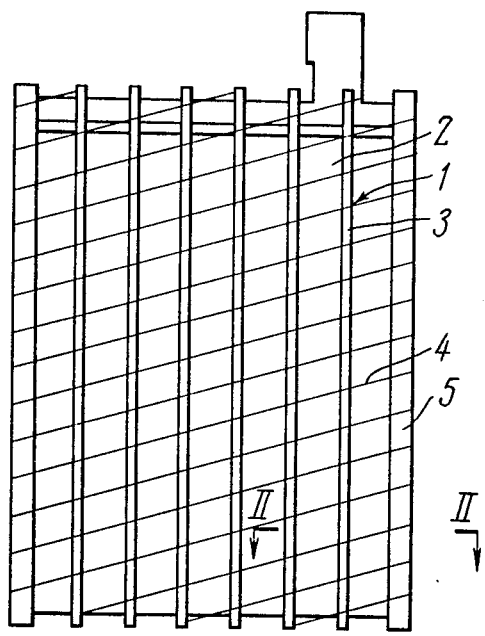
FIG. 1 shows a separator, according to the invention, arranged about an electrode of a storage battery.

A separator for alkaline storage batteries is a reticular flexible envelope 1 (FIG. 1). The envelope 1 is fitted about an electrode 2. The inner perimeter of the envelope 1 is 2-3% smaller than the perimeter of the electrode 2. The reticular flexible envelope 1 includes interlacing plastic rods 3, 4 welded at the points of intersection. The rods 3 are arranged parallel to the longitudinal axis of the electrode 2. During operation of the storage the electrodes 2 are disposed vertically, and, therefore, the rods 3 are also vertical.

The rods 4 are arranged with an inclination relative to the rods 3. A thickness ratio of the vertical rods 3 and the inclined rods 4 is within the range of about 2 to 4; in the present example the ratio is 3. This decreases the disposition of active mass particles of the electrode 2 on the inclined rods 4, and thereby prevents current leakages and shorts in the storage battery (not shown). Thus, the separator described above features improved reliability and life-time and simplifies operation.

Figure 2:
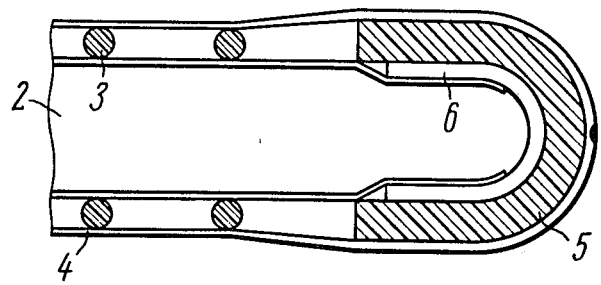
FIG. 2 is an enlarged cross sectional view taken along the line II—II of FIG. 1, according to the invention.

In addition to the rods 3 and 4, the reticular flexible envelope has two vertical blind side plates 5, which are welded to the rods 3 and 4. The plates 5 are placed on side ribs 6 (FIG. 2) of the electrode 2. The side ribs 6 of the electrode 2 and the plate 5 of the envelope 1 are U-shaped.

The plates 5 act as side insulators preventing interelectrode shorts which take place along the edges of the opposite polarity electrodes 2, because of burrs on the ribs 6 of the electrode 2, which are created when cutting the ribs and welding the contact plates (not shown) to the ribs 6. At the same time, owing to the side plates 5 of the separator, formed together with the reticular flexible envelope 1 (FIG. 1) having its inner perimeter 2-3% smaller than the electrode's perimeter, a reliable fixing of the envelope 1 about the electrode 2 is provided and mechanical assembly of the electrode block is possible.

What is claimed is:

1. A separator for alkaline storage batteries comprising a reticular flexible envelope formed by a first group of parallel rods, and a second group of rods arranged with an inclination relative to said first group of rods and being secured thereto, and the rods of said first group of said rods having a greater thickness than the rods of said second group of said rods.

2. The separator according to claim 1, wherein the ratio of the thickness of the rods of said first group of said rods to the thickness of the rods of said second group of said rods is within the range of about 2 to 4.

3. The separator according to claim 1, wherein said rods are joined at their points of intersection.

4. The separator according to claim 3, wherein said envelope including side plates, secured to at least to said second group of rods, and said side plates further acting as insulators.

5. The separator according to claim 1, wherein said first group of rods are parallel to each other, and said second group of rods are also disposed parallel to each other but at said inclination, and said rods are of plastic and are welded at their points of intersection.

* * * * *